United States Patent
Addy

(10) Patent No.: US 9,596,029 B2
(45) Date of Patent: Mar. 14, 2017

(54) TANDEM, VISIBLE LIGHT AND RF COMMUNICATION SYSTEM

(71) Applicant: Honeywell International Inc., Morristown, NJ (US)

(72) Inventor: Kenneth L. Addy, Massapequa, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 69 days.

(21) Appl. No.: 14/273,711

(22) Filed: May 9, 2014

(65) Prior Publication Data

US 2015/0326314 A1 Nov. 12, 2015

(51) Int. Cl.
| | |
|---|---|
| H04B 10/00 | (2013.01) |
| H04B 10/116 | (2013.01) |
| H04B 10/2581 | (2013.01) |
| H04B 10/40 | (2013.01) |
| H04J 14/00 | (2006.01) |

(52) U.S. Cl.
CPC ....... *H04B 10/116* (2013.01); *H04B 10/2581* (2013.01); *H04B 10/40* (2013.01)

(58) Field of Classification Search
CPC .............. H04B 10/114; H04B 10/1141; H04B 10/1134; H04B 10/1149; H04B 10/116
See application file for complete search history.

(56) References Cited

U.S. PATENT DOCUMENTS

2003/0222587 A1* 12/2003 Dowling, Jr. ...... G06Q 30/0201
 315/149
2008/0310850 A1* 12/2008 Pederson ........... G07C 9/00158
 398/135
2013/0300314 A1* 11/2013 Weda ................. H04B 10/1149
 315/291

FOREIGN PATENT DOCUMENTS

WO WO 2013/190410 A1 12/2013

OTHER PUBLICATIONS

Armstrong, et al., Visible Light Positioning: A Roadmap for International Standardization, Visible Light Communications: The Road to Standardization and Commercialization, IEEE Communications Magazine, Dec. 2013, pp. 68 to 73.

Gancarz, et al., Impact of Lighting Requirements on VLC Systems, Visible Light Communications: The Road to Standardization and Commercialization, IEEE Communications Magazine, Dec. 2013, pp. 34 to 41.

Grobe et al, High-Speed Visible Light Communication Systems, Visible Light Communications: The Road to Standardization and Commercialization, IEEE Communications Magazine, Dec. 2013, pp. 60 to 66.

(Continued)

*Primary Examiner* — Daniel Dobson
(74) *Attorney, Agent, or Firm* — Huch Blackwell LLP

(57) ABSTRACT

A system having first and second different communication systems can include a plurality of illumination devices having modulatable optical output signals. A plurality of building control units are in wireless communication with one another. Representative units could include ambient condition detectors, intrusion detectors, output devices, or actuators. At least some of the units include optical sensors responsive to the modulatable optical output signals, wherein, in response to received, modulated optical output signals, a respective control unit carries out a predetermined function.

18 Claims, 2 Drawing Sheets

(56) References Cited

OTHER PUBLICATIONS

Yu et al., Smart Automotive Lighting for Vehicle Safety, Visible Light Communications: The Road to Standardization and Commercialization, IEEE Communications Magazine, Dec. 2013, pp. 50 to 59.
Jovicic et al., Visible Light Communication: Opportunities, Challenges and the Path to Market, Visible Light Communications: The Road to Standardization and Commercialization, IEEE Communications Magazine, Dec. 2013, pp. 26 to 32.
Lim et al., Entertainment Lighting Control Network Standardization to Support VLC Services, Visible Light Communications: The Road to Standardization and Commercialization, IEEE Communications Magazine, Dec. 2013, pp. 42 to 48.
Extended European search report for corresponding EP patent application 15164934.0, dated Oct. 2, 2015.
Michael B. Rahaim et al., "A Hybrid Radio Frequency and Broadcast Visible Light Communication System", Globecom Workshops (GC WKSHPS), Dec. 5, 2011, pp. 792-796.
Olivier Bouchet et al., "Hybrid Wireless Optics (HWO): Building the Next-Generation Home Network", 6th International Symposium on Communication Systems, Jul. 25, 2008.
Networks and Digital Signal Processing, Jul. 25, 2008, pp. 283-287, Piscataway, NJ, USA.

* cited by examiner

TANDEM, VISIBLE LIGHT AND RF COMMUNICATION SYSTEM

FIELD

The application pertains to multi-modal communication systems. More particularly, the application pertains to such systems that incorporate multiple, wireless communication systems of substantially different wavelengths that can operate in tandem.

BACKGROUND

Various types of wireless RF communication systems are known for use in building automation, monitoring, and control systems. While useful, there are limitations as to the type of functionality that such systems can provide. Such systems can also suffer from eavesdropping and exposure to foreign third parties along with power related limitations.

DETAILED DESCRIPTION

Figure 1:
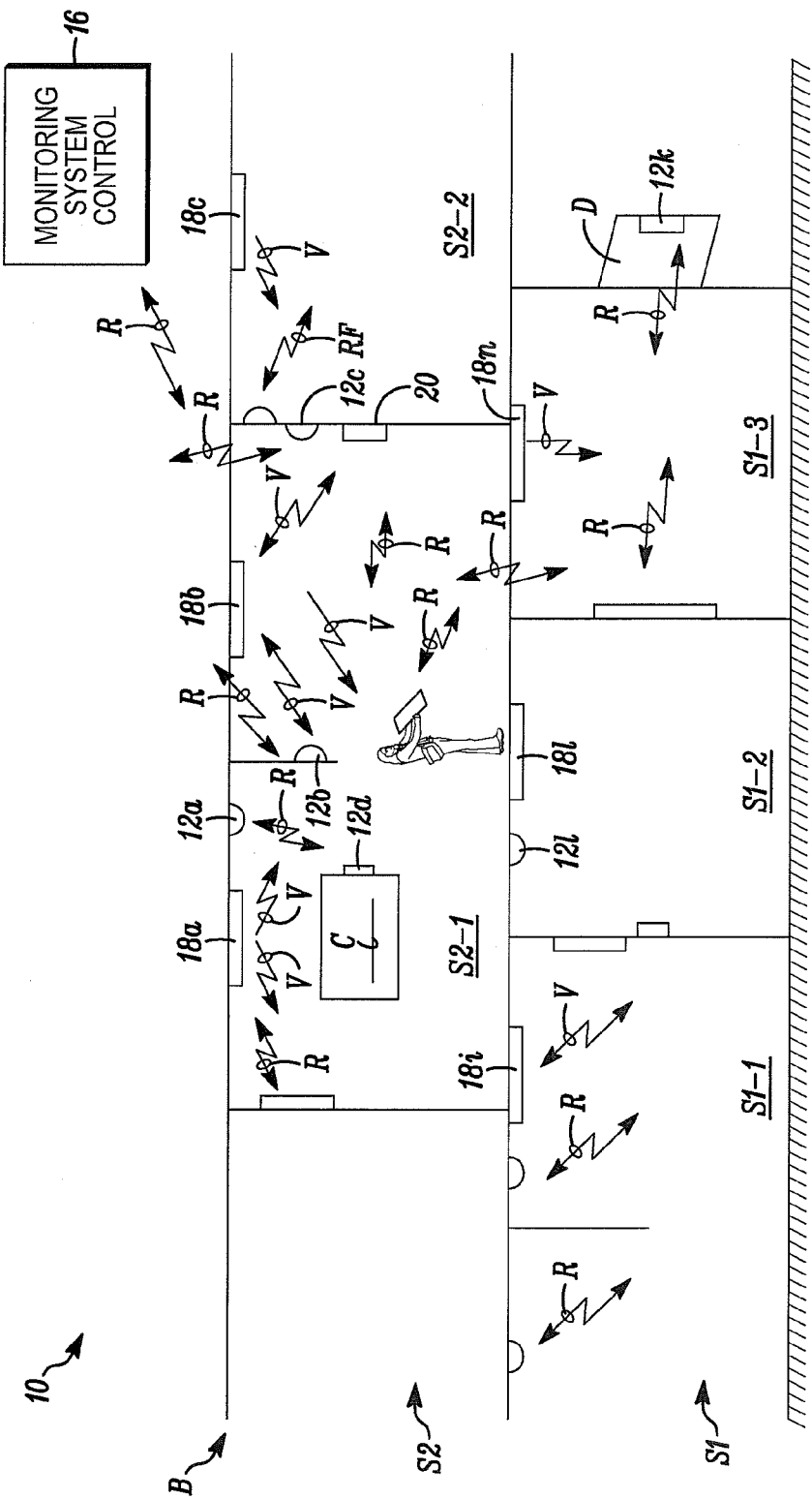
FIG. 1 illustrates a system in accordance herewith.

While disclosed embodiments can take many different forms, specific embodiments hereof are shown in the drawings and will be described herein in detail with the understanding that the present disclosure is to be considered as an exemplification of the principles hereof as well as the best mode of practicing the same and is not intended to limit the claims hereof to the specific embodiment illustrated.

Visible Light Communication (VLC) is a non-disruptive wireless communication solution made possible by the advent of light emitting diode (LED) building illumination systems. A key property of LED lighting is that it can be amplitude modulated at very high rates, providing good data transmission without affecting the illumination function itself.

VLC has several advantages over traditional RF communication systems; the operation is unlicensed, and the transmission path is contained (by walls) so spatial re-use is not an issue nor is eavesdropping beyond the room/building walls a problem. Further, the cost of transmission and reception is low. Since wavelengths are short, there are good ranging and location opportunities. The downsides of VLC are short operating range and, of course, the lights need to be powered and modulated to operate as a communication service in addition to providing illumination.

In fact, RF communication and VL communication operating together offer several complementary properties. As discussed below, complementary or tandem operation offers additional control configurations not available with a single wireless system.

Examples of functionality available with multi-modal communication systems follow. The particular characteristics of the different types of communication systems can be selected and allocated to implement various functions that might be difficult or expensive to implement with one type of communication system, but that can be very cost effectively provided with the second type of system.

Those of skill will understand that the following are exemplary only and are not limitations hereof. Numerous additional possibilities are available with multiple complimentary communication systems.

In particular, the following exemplary functionality is possible with VLC and RF communication systems operating in tandem. The following examples contribute to extending battery life of wireless units. Synchronized sirens or sounders can be provided for battery-powered smoke detectors. In such instances, if one goes, then all go sound operation is possible. Redundant operation preserves batteries in the RF emergency devices by using VLC communication when the lights are on and RF when they are not.

Synchronizing optical signals can be sent to RF transceivers at much lower operating current in the battery powered device than would be possible if synchronization was via the RF signals. In-building location services can be provided. In this regard, a security system portable tablet control unit or phone could use its built-in camera to detect the nearest modulated LED light fixture and, therefore, its location, again enabling smart room operation.

In yet another aspect, smart room RF based functionality can be augmented. For example, a manually operated light switch can indicate occupancy and can trigger other devices in the illuminated area when the light is turned on or energized. A shade or blind can automatically be closed when the light is turned on. Similarly, the heat could be turned on or up or a door locked or unlocked in response to a light being turned on. Status requests to remote detectors could reduce overall quiescent current if the request to the battery powered detector was via VLC with the sensor response via RF. Those of skill will understand that these are examples and not limitations hereof.

In principle, the enabling technology includes an ability to amplitude modulate individual LED light fixtures in conjunction with the capability of high speed photo diodes to detect messages in building control products and portable devices. As those of skill will understand, the examples disclosed herein require various data protocols—both RF and visible light—to enable timing accuracy for timing and synchronization. Addressable lighting fixtures and control devices that can detect RF and/or VLC signals are useful in the present context.

Further, elements of the VLC system can transmit a change of status indication, for example, "turning-off", to alert local RF devices. Alternately, a change of status message indicating "light on" could also be transmitted.

FIG. 1 illustrates a system 10 in accordance herewith installed in a building B. The building B has two floors indicated by spaces S1, S2. A plurality 12 of detectors and/or output devices 12a, 12b, 12c . . . 12n, which can be in wireless RF communication R, are illustrated scattered throughout the building B as would be understood by those of skill in the art.

The plurality 12 can include fire or gas detectors, intrusion or other security monitoring detectors, output devices, such as audible or visual alarm indicating devices, or solenoids or other types of actuators all without limitation. For example, the unit 12a can be implemented as a fire detector, the unit 12b could be implemented as a gas detector, and the unit 12c could be implemented as an intrusion detector. The unit 12d can be an actuator, which could implement a linear motion in response to a received command. All such devices can be in wireless RF communication R with a displaced monitoring system control unit 16.

Other devices in a plurality 18 can emit visible light and provide both an illumination function as well as modulated beams of radiant energy V, which can provide a second communication mode that can compliment the above noted RF communication mode of operation. For example, the devices 18a, 18b, 18c . . . 18p can provide illumination to the respective adjacent regions, such as S1-1, S1-2 . . . S1-n in space S1 or S2-1, S2-2 in space S2. In addition, such devices can emit modulated beams of visible radiant energy V, which can provide additional or different control functions than provided by the wireless RF system.

For example, a manually operable switch 20 can be used to turn on a light emitting diode source 18b, which can not only provide illumination in sub-region S2-1, but also emit the above noted modulated, visible, radiant energy V, which can, in turn, cause the actuator 12d to open or close a curtain or shade C or unlock a door. Radiant energy signals V from the switch 20 could also provide synchronization signals to the detectors or output devices 12b,c. The devices 12b, c can then communicate via RF communication links R with the monitoring system 16 or other units in the building B.

Figure 2:
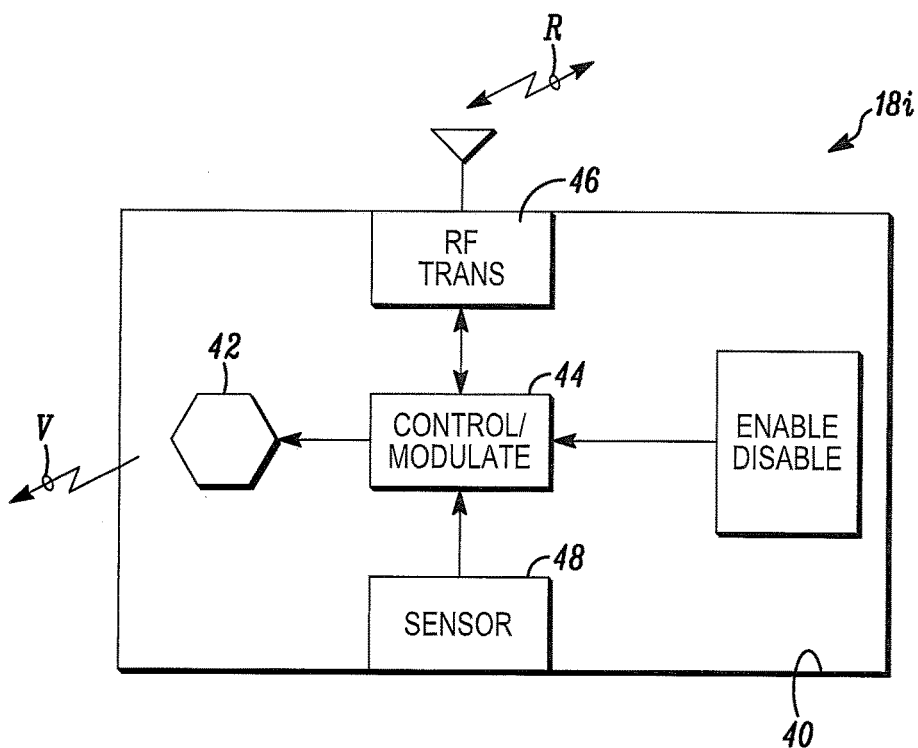
FIG. 2 is a block diagram of an illumination element in accordance herewith.

FIG. 2 is a block diagram of an illumination element, such as 18i, in accordance herewith. The element 18i includes a housing 40, which carries a source 42 of visible light, for example, one or more light-emitting-diodes. Control circuits 44 can energize the source 42 to provide both visible light for illumination and a modulated, coded, data sequence, which can be detected and responded to by other units in the vicinity of the element 18i.

Optionally, the unit 18i can also include an RF transceiver 46 and one or more sensors 48 as desired. Those of skill will understand that the exemplary illumination element 18i can implement a variety of communication modes in accordance herewith to maximize battery life of the various wireless units 12i or to provide additional "smart house" functionality as desired.

Figure 3:
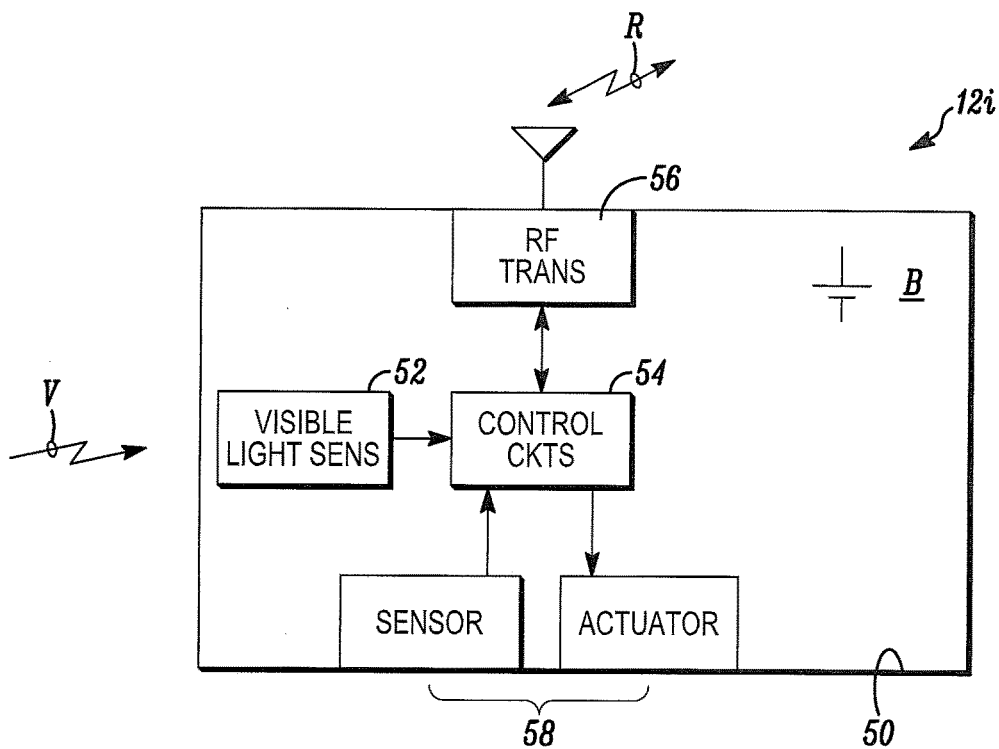
FIG. 3 is a block diagram of a radio frequency enabled device in accordance herewith.

FIG. 3 is a block diagram of a detector or actuator 12i, such as 12a-12d. The unit 12i can be carried by a housing 50 and include light sensors 52, which can respond to coded messages from the element 18i as described above. Control circuits 54 can decode messages received from the sensors 52 and/or RF messages received from a transceiver 56. The units, such as 12i, can carry one or more condition sensors and/or actuators as at 58 all without limitation. The units, such as 12i, can be energized by batteries B whose life can be extended by the above described processes of using multi-model communication.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A multi-mode communication system comprising:
a plurality of devices that includes at least one building control unit;
a radio frequency communication system that provides wireless communication between members of the plurality of devices; and
a visible light communication system that provides different communication than provided by the radio frequency communication system between at least some of plurality of devices,
wherein the radio frequency communication system and the visible light communication system operate in tandem to implement selected functionality, and
wherein the visible light communication system provides a radiant energy signal to synchronize the members of the plurality of devices for communicating via the radio frequency communication system.

2. A system as in claim 1 wherein the plurality of devices are selected from a class that includes at least manually operable light switches, ambient condition detectors, intrusion detectors, building control devices, regional access control equipment, actuation units, and audio output devices.

3. A system as in claim 1 wherein the visible light communication system includes visible light transmitters that illuminate regions in a vicinity of respective ones of the visible light transmitters.

4. A system as in claim 1 wherein the at least some of the plurality devices include at least one visual light sensor and at least one of a radio frequency receiver or a radio frequency transmitter.

5. A system as in claim 1 wherein at least one of the plurality of devices includes at least one light emitting diode to provide local illumination and to provide modulated optical outputs.

6. A system as in claim 2 wherein the at least some of the plurality of devices include at least one visual light sensor, at least one of a radio frequency receiver or a radio frequency transmitter, and at least one light emitting diode to provide local illumination and to provide modulated optical outputs.

7. A system as in claim 1 wherein, when the visible light communication system is not available, the radio frequency communication system provides at least some synchronizing signals.

8. A system as in claim 1 wherein the at least some of the plurality of devices include light emitting diodes that are modulated to generate visible beams of control signals and to provide local illumination.

9. A system comprising:
a plurality of illumination devices having modulated visible output signals; and
a plurality of building control units that are in wireless communication with one another,
wherein at least some of the plurality of building control units include optical sensors responsive to the modulated visible output signals,
wherein, responsive to receiving the modulated visible output signals, respective ones of the plurality of building control unit carry out a predetermined function, and
wherein some of the plurality of illumination devices emit a change of state message when illumination is being terminated.

10. A system as in claim 9 wherein, in an absence of the modulated visible output signals, the at least some of the plurality of building control units communicate via radio frequency signals.

11. A system as in claim 10 wherein the plurality of building control units are selected from a class that includes at least manually operable light switches, ambient condition detectors, intrusion detectors, building control equipment, regional access control equipment, actuation units, and audio output devices.

12. A system as in claim 9 wherein a second change of state message is emitted when the illumination is being enabled.

13. A system having first and second different wireless communication systems comprising:
a plurality of illumination devices having modulated optical output signals, and a plurality of building control units in wireless communication with one another via non-optical signals, wherein some of the plurality of building control units are selected from a class that includes at least ambient condition detectors, intrusion detectors, output devices, or actuators, wherein the some of the plurality of building control units include optical sensors responsive to the modulated optical output signals, and wherein, responsive to receiving the modulated optical output signals, the some of the plurality of building control units carry out a predetermined function and communicate non-optically in connection therewith.

14. A system as in claim 13 wherein, in an absence of the modulated optical output signals, the plurality of building control units communicate via non-optical signals.

15. A system as in claim 14 wherein the plurality of illumination devices provide local illumination.

16. A system as in claim 15 wherein the non-optical signals comprise radio frequency signals.

17. A system as in claim 13 wherein the modulated optical output signals provide synchronization signals.

18. A system as in claim 17 wherein, in an absence of the modulated optical output signals, at least some of the synchronization signals are provided via radio frequency signals.

* * * * *